United States Patent

Hisao et al.

[11] 4,436,675
[45] Mar. 13, 1984

[54] MULTISTAGE WATER PURIFICATION APPARATUS

[75] Inventors: Makino Hisao, Chiba; Kozima Sadao, Tokyo, both of Japan

[73] Assignee: Kaiyo Kogyo Co., Ltd., Tokyo, Japan

[21] Appl. No.: 408,716

[22] Filed: Aug. 16, 1982

[30] Foreign Application Priority Data

Oct. 26, 1981 [JP] Japan ................. 56-170951

[51] Int. Cl.³ .......................... B01D 47/02
[52] U.S. Cl. ..................... 261/77; 261/120; 261/121 R; 210/220; 210/242.2; 210/416.1
[58] Field of Search ............ 210/220, 805, 242.2, 210/416.2, 416.3, DIG. 9, 926, 416.1; 261/77, 120, 121 R

[56] References Cited

U.S. PATENT DOCUMENTS

| | | | |
|---|---|---|---|
| 2,669,440 | 2/1954 | Lindenbergh | 261/77 |
| 3,887,660 | 6/1975 | Romantschuk et al. | 210/242.2 |
| 4,060,574 | 11/1977 | Verner et al. | 210/242.2 |
| 4,210,613 | 7/1980 | Webb | 210/242.2 |
| 4,230,570 | 10/1980 | Irving | 261/77 |
| 4,278,546 | 7/1981 | Roesler | 261/77 |
| 4,293,506 | 10/1981 | Lipert | 261/77 |
| 4,300,924 | 11/1981 | Coyle | 261/77 |
| 4,308,137 | 12/1981 | Freeman | 210/242.2 |

FOREIGN PATENT DOCUMENTS 15308 6/1973 Switzerland ............. 210/242.2

*Primary Examiner*—Charles N. Hart
*Assistant Examiner*—Wanda L. Millard
*Attorney, Agent, or Firm*—Wenderoth, Lind & Ponack

[57] ABSTRACT

A multistage water purification method in which water purifiers are arranged in stages in water regions of different depths. Air is made to ascend intermittently in each depth region by the water purifier to stir and mix the water with the air to enrich the water in oxygen thereby to purify the water. Disclosed also is a water purification apparatus for carrying out the water purification method. The apparatus includes an upper stage water purifier having a buoyancy chamber, a pumping sleeve and water suction tubes, and at least one lower stage water purifier having an arcuate deflector, a pumping sleeve and an air chamber. The upper stage water purifier and the lower stage water purifier are connected in series in vertical alignment or, alternatively, offset in the horizontal direction from each other.

3 Claims, 6 Drawing Figures

MULTISTAGE WATER PURIFICATION APPARATUS

BACKGROUND OF THE INVENTION

1. Field of the Invention

The present invention relates to a multistage water purification apparatus and, more particularly, to an apparatus for purifying water by means of a plurality of water purifiers arranged in stages corresponding to different depths where the water has different temperatures.

2. Description of the Prior Art

Various methods and apparatus have been proposed hitherto for purifying water in dams, lakes and marshes, rivers and so forth. These known methods and apparatus, however, can not effectively stir and mix the water in the surface region and the water in the deep region independently and, hence, cannot independently make the water temperature and the dissolved oxygen content in these regions uniform. This does not matter substantially when the difference of temperature between the water in the surface region and the water in the deep region is small. However, when the temperature difference is large, e.g. 10° C., the mean water temperature of the water after the stirring comes down below a predetermined level. In the case of a multipurpose dam intended for supplying water for agricultural use, the reduction of water temperature down below a predetermined temperature may adversely affect the agricultural products.

SUMMARY OF THE INVENTION

Accordingly, an object of the invention is to provide a water purification apparatus which can eliminate the above-described problem of the prior art.

To these ends, according to one aspect of the invention, there is provided a multistage water purification apparatus in which a plurality of water purifiers are arranged in stages corresponding to different depths where the water has different temperatures, and a pumping action is effected by air in stages to stir the water and to bring the air into contact with the water to increase the dissolved oxygen content in the water while minimizing the water temperature drop in the surface region.

The apparatus comprises: an upper stage water purifier having a buoyancy chamber, water pumping sleeve, water suction pipes and an air chamber, the upper stage water purifier being connected at its upper end to a plurality of floats; and a lower stage water purifier having an arcuate deflector, pumping sleeve, water suction pipes and an air chamber, the lower stage water purifier being connected at its lower end to a weight, the upper stage water purifier and the lower stage water purifiers being directly connected to each other vertically and spaced from each other. In some cases, the upper stage water purifier and the lower stage water purifier make a common use of an air chamber.

The invention will be fully described hereinunder with reference to the accompanying drawings showing preferred embodiments of the invention.

DESCRIPTION OF THE PREFERRED EMBODIMENTS

Figure 2:
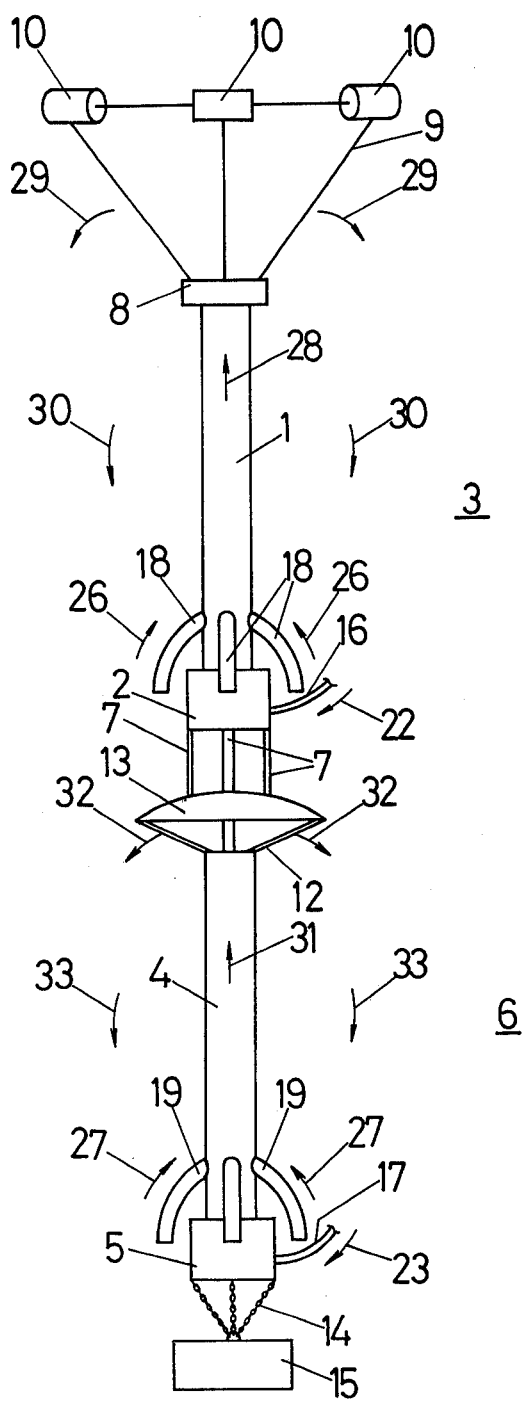
FIG. 2 is a schematic front elevational view of the multistage water purification apparatus shown in FIG. 1.

Referring to FIG. 2, an upper stage water purifier 3 has a pumping sleeve 1, a plurality of water suction pipes 18 and an air chamber 2. A buoyancy chamber 8 attached to the upper end of the pumping sleeve 1 is connected by connecting members 9 to a plurality of floats 10.

On the other hand, a lower stage water purifier 6 has a pumping sleeve 4, a plurality of water suction pipes 19 and an air chamber 5. An arcuate deflector 13 is attached to the upper end of the pumping sleeve 4 by connecting rods 12. A weight 15 is suspended from the lower end of the air chamber 5 by a plurality of chains 14. The deflector 13 is connected to the air chamber 2 of the upper stage water purifier 3 by connecting members 7 which may be bars made of a plastic, ropes or chains.

The distance between the water surface 11 (See FIG. 1) and the upper end of the upper stage water purifier 3 is determined by the length of the connecting members 9. Preferably, in most cases, the length of the connecting members 9 is selected to range between 2 m and 5 m.

Figure 3:
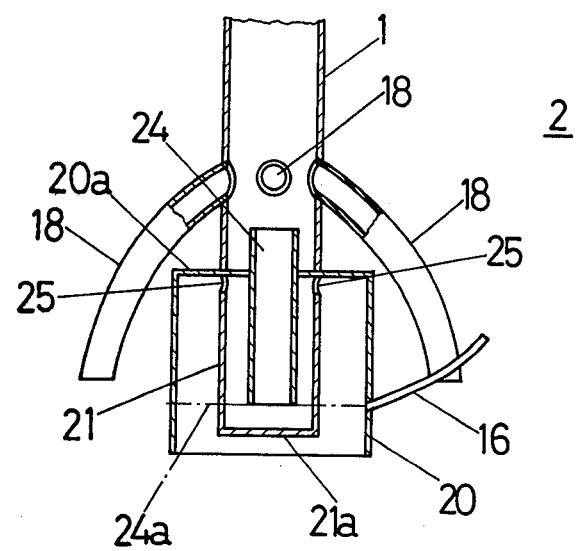
FIG. 3 is a sectional front elevational view of an air chamber.

As will be seen from FIG. 3, the air chamber 2 of the upper stage water purifier 3 is composed of an outer cylinder 20 having a top plate 20a, an inner cylinder 21 having a bottom plate 21a, and an air relief pipe 24. The inner cylinder 21 is placed in the outer cylinder 20 concentrically with the latter so as to leave a predetermined radial gap therebetween. The air relief pipe 24 extends upwardly through the central portion of the top plate 20a into the pumping sleeve 1. The lower end of the air relief pipe 24 is positioned in the vicinity of the bottom plate 21a of the inner cylinder 21. An air supply tube 16 is communicated with the interior of the outer cylinder 20 through the wall thereof. The air chamber 5 of the lower stage water purifier 6 has substantially the same construction as the air chamber 2 of the upper stage water purifier 3 and is provided with an air supply tube 17.

In the upper stage water purifier 3, therefore, as compressed air is supplied through the air supply tube 16 into the outer cylinder 20 of the air chamber 2 as indicated by the arrow 22, the compressed air is gradually accumulated in the upper portion of the outer cylinder 20 and, then, the air is introduced also into the space in the inner cylinder 21 through air passage holes 25 formed in the wall of the inner cylinder 21. In consequence, the water level in the outer cylinder 20 and the inner cylinder 21 is gradually depressed by the compressed air.

When the water level in the inner and outer cylinders 21 and 20 is lowered to the lower end of the air relief pipe 24 indicated by the chain line 24a, the compressed air accumulated in the inner and outer cylinders is relieved at once into the air relief pipe 24 and rushes into the pumping sleeve 1. Thus, the air is relieved repeatedly at a constant time interval which is determined by the length of time required for the accumulation of the compressed air in the inner and outer cylinders. Thus, the air ascends through the pumping sleeve 1 intermittently, so that the water around the lower portion of the pumping sleeve 1 is sucked up through the water suction pipes 18 and is pumped upwardly through the pumping sleeve 1. Consequently, the water is recirculated as indicated by arrows 28, 29 and 30.

As the air in the inner and outer cylinders 21 and 20 of the air chamber 20 is exhausted, the next mass of air starts to accumulate in the upper portions of the interior spaces of the inner and outer cylinders 21 and 20, so that the ascent of the air takes place intermittently. The recirculation of the water, however, is continuous because the water sandwiched between two successive bubbles of air is moved upward as these two bubbles of air ascend through the pumping sleeve 1. Thus, the water ascends through the pumping chamber from the lower portion to the upper portion thereof and falls to the outside of the pumping sleeve.

The same action as that performed by the upper stage water purifier 3 is achieved also in the lower stage water purifier 6. Namely, as the compressed air is supplied into the air chamber 5 through the air supply tube 23, the air intermittently ascends through the pumping sleeve 4 to cause a continuous sucking of the water around the lower part of the pumping sleeve 4 through the water suction pipes 19 as indicated by arrows 27. The water then ascends through the pumping sleeve 4 as indicated by the arrow 31, and is deflected sideways by the arcuate deflector 13 as indicated by arrows 32. The water then flows downward as indicated by arrows 33 thus achieving a recirculation.

Figure 1:
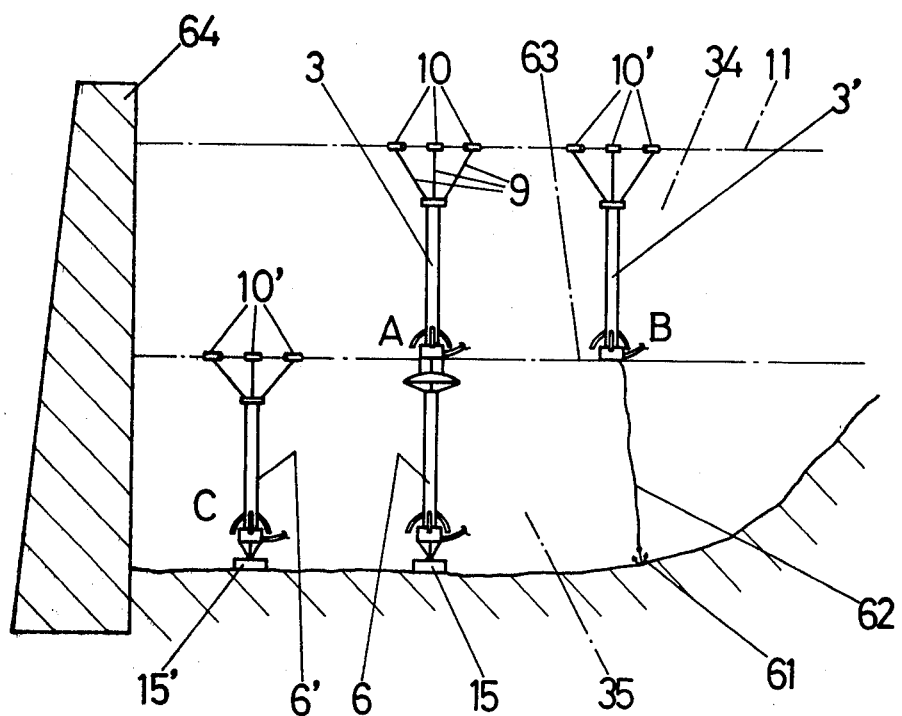
FIG. 1 is a schematic illustration of general arrangement of a multistage water purification apparatus in accordance with an embodiment of the invention.

In the multistage water purification apparatus of the invention, the upper stage water purifier 3 and the lower stage water purifier 6 may be connected to each other and are placed as a unit at a suitable position by means of the chains and the weight 15, as indicated at A in FIG. 1. In such an arrangement, the mutual contact and, hence, mixing of water and air take place in the surface region 34 and in the deep region 35 independently by the action of the upper stage water purifier 3 and the lower stage water purifier 6, so that the dissolved oxygen content in both regions 34 and 35 is increased uniformly to purify the water.

Alternatively, the upper stage water purifier 3' can be placed in the surface region 34 by means of an anchor 61 and a chain 62 as indicated at B, while the lower stage water purifier 6' can be placed in the deep region 6' at a position spaced horizontally from the upper stage water purifier 3' as indicated at C, so that the water in the surface region 34 and the water in the deep region 35 are treated independently as in the case of the arrangement A.

It will be understood by those skilled in the art that in each of the arrangements A and B,C, the water in the surface region and the water in the deep region are stirred independently of each other, so that the undesirable excessive change in the water temperature does not take place. Furthermore, the water purification apparatus of the invention permits the treatment of water only in the region requiring the treatment, by suitably suspending the supply of the compressed air through the air supply tube 22 or 23. In the drawings, reference numeral 63 denotes the boundary between the surface region and the deep region, while numeral 64 designates a bank or a dam.

Figure 4:
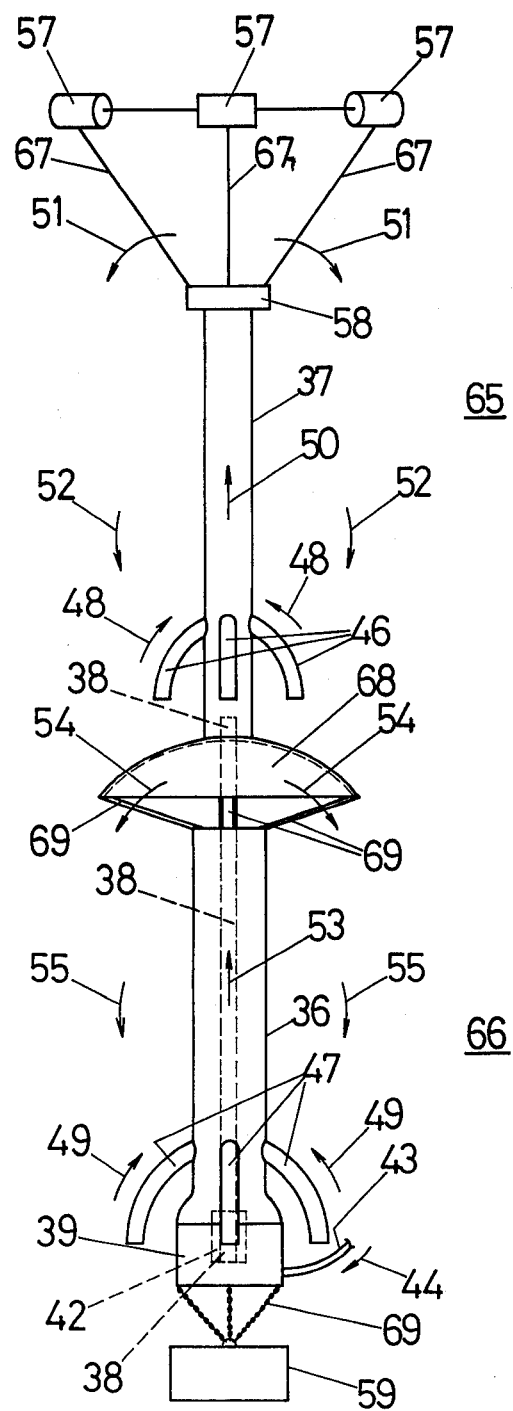
FIG. 4 is a schematic front elevational view of another embodiment.

FIG. 4 shows another embodiment of the invention in which the upper stage water purifier 65 is composed of a pumping sleeve 37, air relief pipe 38, air chamber 39, a plurality of water suction pipes 46 and a buoyancy chamber 58, and is connected at its upper end to a plurality of floats 57 by connecting members 67.

Figure 5:
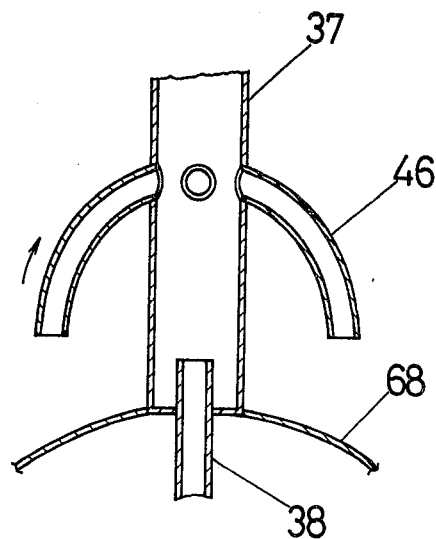
FIG. 5 is an enlarged sectional view of a water suction pipe of an upper stage water purifier incorporated in the apparatus shown in FIG. 4.

A lower stage water purifier 66 is composed of a pumping sleeve 36, a plurality of water suction pipes 47 and an arcuate deflector 68 (See FIG. 5), and is connected vertically to the upper stage water purifier 65 by the deflector 68. The upper stage water purifier 65 and the lower stage water purifier 66 make common use of the air chamber 39 which is provided at the lower end of the pumping sleeve 36. A weight 59 is suspended from the lower end of the air chamber 39 by chains 69.

The air chamber 39 has the same construction as the air chamber 2 of the preceding embodiment described in connection with FIG. 3. Namely, the air chamber 39 is provided with an outer cylinder 40, inner cylinder 41, air relief pipe 42 and an air supply tube 43. The air relief pipe 38 of the upper stage water purifier 65 extends into the air chamber 39 through the pumping sleeve 36 and the air relief pipe 42 in the lower stage water purifier 66, as will be seen from FIG. 6.

Figure 6:
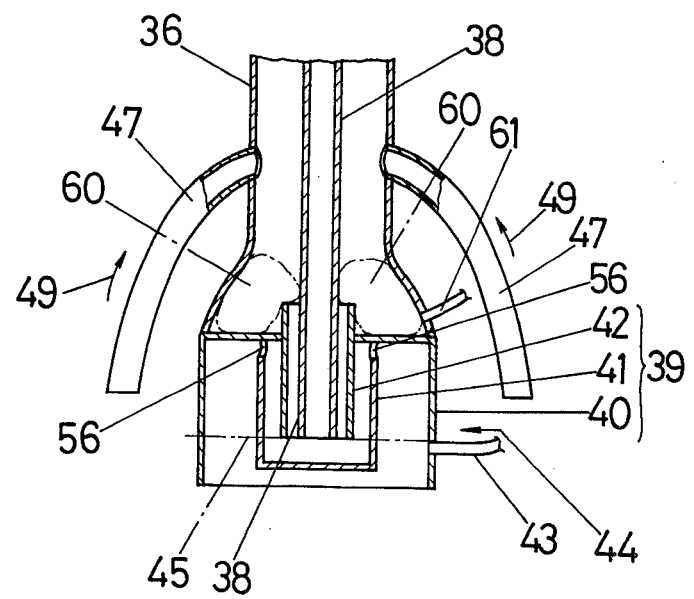
FIG. 6 is a sectional front elevational view of an air chamber incorporated in a lower stage water purifier incorporated in the apparatus shown in FIG. 4.

In operation, therefore, as the compressed air is introduced into the air chamber 39 through the air supply tube 43 as indicated by the arrow 44, the water level in the outer cylinder 40 and inner cylinder 41 is gradually lowered. As the water level is lowered to the level indicated by a chain line 45 which is slightly below the lower ends of the air relief pipes 38 and 42, the compressed air accomulated in the inner and outer cylinders 41 and 40 ascends through respective air relief pipes 38 and 42 in the form of air masses, so that water is sucked into the pumping sleeves 37 and 36 through the water suction pipes 46 and 47 as indicated by arrows 48 and 49, respectively. The water then flows upwardly in the respective pumping sleeves as indicated by arrows 50 and 53 and downward flow of water takes place in the area around the upper stage water purifier 65 and the lower stage water purifier 66 as indicated by arrows 51 and 52, and 54 and 55, respectively. In FIG. 6, reference numeral 56 denotes passage holes formed in the wall of the inner cylinder 41.

A ring-shaped inflatable member 60 is disposed in the lower part of the pumping sleeve 36 of the lower stage water purifier 66 so as to be seated on the top wall of the air chamber 39. The ring-shaped inflatable member 60 is adapted to be inflated and contracted by air supplied and discharged through an air supply tube 61, thereby to selectively open and close the upper end opening of the air relief pipe 42. It is, therefore, possible to put only the upper stage water purifier 65 into operation to stir the water and increase the dissolved oxygen content only in the surface region.

Although the water purification apparatus of the described embodiments have only two water purifier stages, it is possible to use three or more stages of water purifiers corresponding to the total depth of the water.

In general, the water discharged from a dam for agricultural purpose should have a temperature higher than 20° C. for otherwise the agricultural products will be adversely affected. In the case of dams in which more than 30% of the whole water area has depths exceeding 25 m, the water temperature in the bottom region is gradually lowered as the depth increases and is about 4°

C. in the bottom region of the dam even in the summer season in which the water temperature in the surface region is as high as 25° C. If the water in the surface region and the water in the bottom region are mixed together, therefore, the mean water temperature comes down below 20° C. when calculated simply. It is not desirable to use such cold water for the agricultural purpose.

This problem, however, can be completely overcome by the multistage water purification apparatus of the invention. Namely, according to the invention, the water purifiers are arranged in two stages, i.e. one water purifier is disposed in the surface region down to 20 m depth from the water surface while another water purifier is disposed in the region deeper than 20 m. According to this arrangement, it is possible to enrich the water in both the surface region and deep region in oxygen while preserving the sufficiently high water temperature, e.g. 20° C., even when the depth is large to maintain the water temperatures of 25° C. and 4° C. in the surface region and in the bottom region, respectively. Furthermore, the upper stage water purifier and the lower stage water purifier can advantageously be operated and controlled independently of each other.

From the foregoing description, it will be clear to those skilled in the art that the water purification apparatus of the invention offers various remarkable advantages over the prior art.

Although the invention has been described with respect to specific preferred forms, it is to be understood here that the described embodiments are not exclusive and various changes and modifications may be imparted thereto without departing from the scope of the invention which is limited solely by the appended claims.

What is claimed is:

1. A multistage water purifier comprising:
    an upper stage water purifier constituted by an upper pumping sleeve, a plurality of upper suction pipes opening into said upper pumping sleeve, a buoyancy chamber provided on the upper end of said upper pumping sleeve, a plurality of floats above the upper end of said upper pumping sleeve, connecting members connecting said floats to the upper end of said upper pumping sleeve for maintaining the upper end of said upper pumping sleeve a predetermined distance below said floats, and an intermittent air supplying means in the lower portion of said upper pumping sleeve for intermittently supplying air into said pumping sleeve; and
    a lower stage water purifier constituted by a lower pumping sleeve, a plurality of lower suction pipes opening into said lower pumping sleeve, an arcuate deflector attached to the upper end of said lower pumping sleeve, an intermittent air supplying means in the lower end portion of said lower pumping sleeve for supplying air intermittently into said lower pumping sleeve, a weight, and a chain means connecting said weight to the lower end of said lower pumping sleeve, the upper end of said lower stage water purifier being connected to the lower end of said upper stage water purifier;
    said intermittent air supplying means of at least said upper stage water purifier having an air chamber for feeding air intermittently, said air chamber including an outer cylinder having a top plate, an inner cylinder having a bottom plate and positioned in said outer cylinder and spaced from the inner surface of the wall thereof, an air relief pipe attached to and opening upwardly through said top plate into said upper pumping sleeve and extending downwardly into said inner cylinder to a point spaced from and opposed to the bottom plate of said inner cylinder, and an air supplying tube connected to said outer cylinder for supplying pressurized air thereinto, said air relief pipe being sufficiently large to discharge into said upper pumping sleeve a bubble of air sufficient to substantially fill said upper pumping sleeve.

2. A multistage water purifier as claimed in claim 1 in which said intermittent air supplying means of said lower stage water purifier has an air chamber for feeding air intermittently, said air chamber including an outer cylinder having a top plate, an inner cylinder having a bottom plate and positioned in said outer cylinder and spaced from the inner surface of the wall thereof, an air relief pipe attached to and opening upwardly through said top plate into said lower pumping sleeve and extending downwardly into said inner cylinder to a point spaced from and opposed to the bottom plate of said inner cylinder, and a further air supplying tube connected to said outer cylinder for supplying pressurized air thereinto, said last-mentioned air relief pipe being sufficiently large to discharge into said lower pumping sleeve a bubble of air sufficient to substantially fill said lower pumping sleeve.

3. A multistage water purifier comprising:
    an upper stage water purifier constituted by an upper pumping sleeve, a plurality of upper suction pipes opening into said upper pumping sleeve, a buoyancy chamber provided on the upper end of said upper pumping sleeve, a plurality of floats above the upper end of said upper pumping sleeve, connecting members connecting said floats to the upper end of said upper pumping sleeve for maintaining the upper end of said upper pumping sleeve a predetermined distance below said floats;
    a lower stage water purifier constituted by a lower pumping sleeve, a plurality of lower suction pipes opening into said lower pumping sleeve, an arcuate deflector attached to the upper end of said lower pumping sleeve, and a chain means connecting a weight to the lower end of said lower pumping sleeve, the upper end of said lower stage water purifier being connected to the lower end of said upper stage water purifier; and
    an intermittent air supplying means at the lower end of said lower stage water purifier and having an air chamber for feeding air intermittently, said air chamber including an outer cylinder having a top plate, an inner cylinder having a bottom plate and positioned in said outer cylinder and spaced from the inner surface of the wall thereof, an upper air relief pipe opening upwardly through said top plate and extending within said lower pumping sleeve upwardly into said upper pumping sleeve and extending downwardly into said inner cylinder to a point spaced from and opposed to the bottom plate of said inner cylinder, and a lower air relief pipe concentric with and spaced from said upper air relief pipe and opening upwardly through said top plate into said lower pumping sleeve and extending downwardly into said inner cylinder to a point spaced from and opposed to the bottom plate of said inner cylinder, and an air supplying tube connected to said outer cylinder for supplying pressurized air thereinto, said air relief pipes being sufficiently large to discharge into said pumping sleeves a bubble of air sufficient to substantially fill said pumping sleeves.

* * * * *